US011792331B2

(12) United States Patent
Kameyama

(10) Patent No.: US 11,792,331 B2
(45) Date of Patent: Oct. 17, 2023

(54) MOTOR CONTROL APPARATUS AND IMAGE FORMING APPARATUS FOR DETERMINING STOP POSITION OF ROTOR

(71) Applicant: CANON KABUSHIKI KAISHA, Tokyo (JP)

(72) Inventor: Shigeru Kameyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/751,369

(22) Filed: May 23, 2022

(65) Prior Publication Data

US 2022/0385770 A1 Dec. 1, 2022

(30) Foreign Application Priority Data

Jun. 1, 2021 (JP) .................................. 2021-092510

(51) Int. Cl.
*H04N 1/00* (2006.01)
*G03G 15/00* (2006.01)

(52) U.S. Cl.
CPC ......... *H04N 1/00034* (2013.01); *G03G 15/80* (2013.01); *H04N 1/00037* (2013.01); *H04N 1/00602* (2013.01)

(58) Field of Classification Search
None
See application file for complete search history.

(56) References Cited

U.S. PATENT DOCUMENTS

2015/0145454 A1* 5/2015 Kameyama ........ G03G 15/5008
318/400.34
2020/0235680 A1* 7/2020 Kameyama ........ G03G 15/5004

FOREIGN PATENT DOCUMENTS

| JP | 2004-266987 A | 9/2004 |
| JP | 2006-166574 A | 6/2006 |
| JP | 2015-104263 A | 6/2015 |
| JP | 2020-120466 A | 8/2020 |
| WO | 2008/120734 A | 7/2010 |

* cited by examiner

*Primary Examiner* — Andrew H Lam
(74) *Attorney, Agent, or Firm* — Canon U.S.A., Inc. I.P Division

(57) ABSTRACT

A motor control apparatus includes a voltage control unit and a current detection unit. The voltage control unit controls a voltage when applied to cause current to flow through the coils a motor that is detected by the current detection unit. When measurement processing is performed on a set from a plurality of sets of coils having two coils each, a first detection result is obtained by the coil current flowing from a first coil of the set to a second coil of the set. A second detection result then is obtained by the coil current flowing from the second coil to the first coil. The stop position of the rotor of the motor is determined based on the first detection result and the second detection result obtained for each of the plurality of sets of coils.

14 Claims, 13 Drawing Sheets

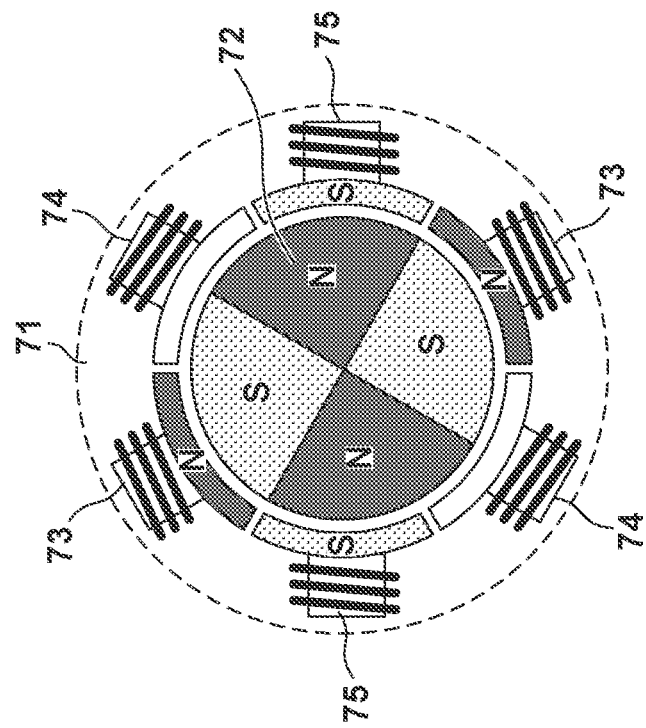
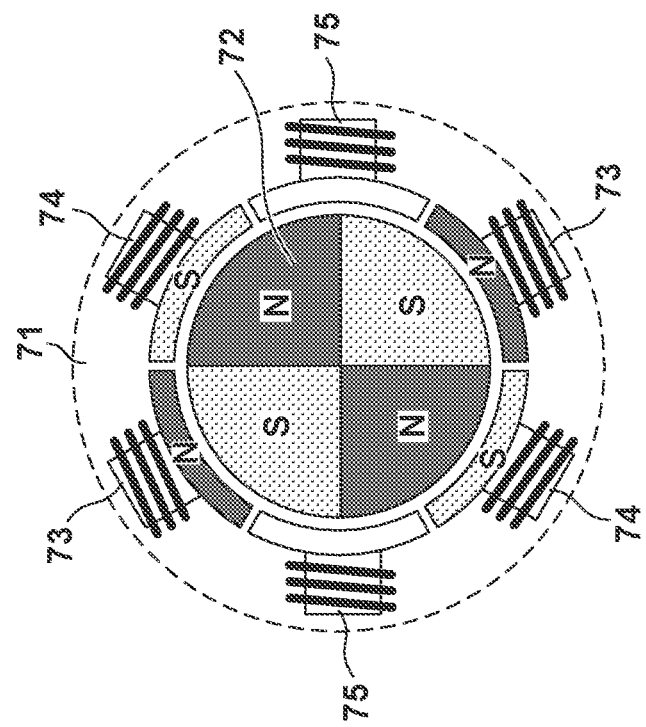

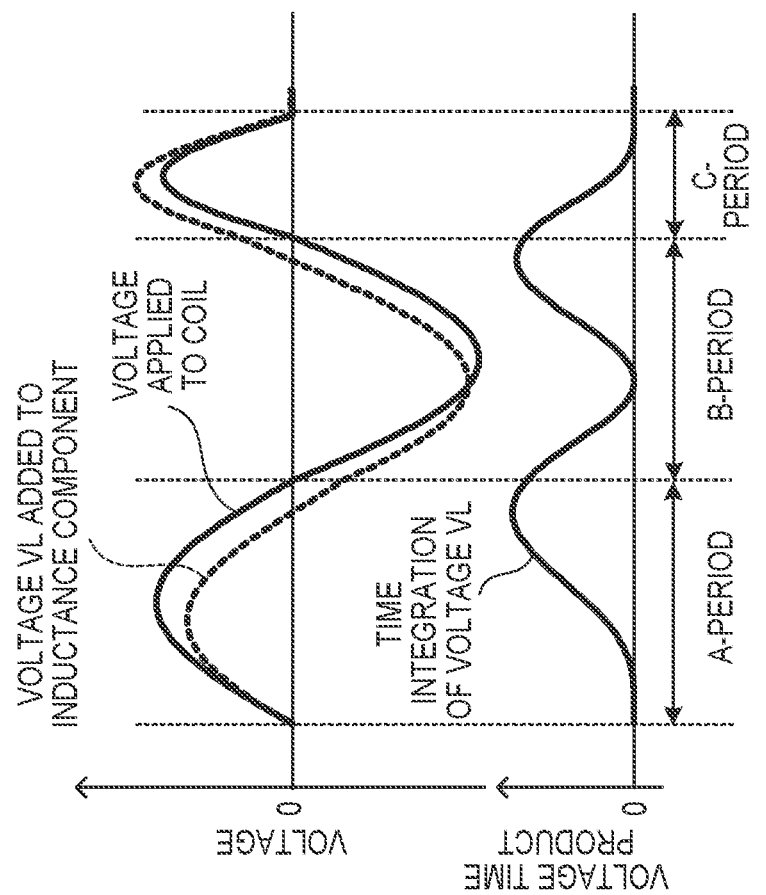
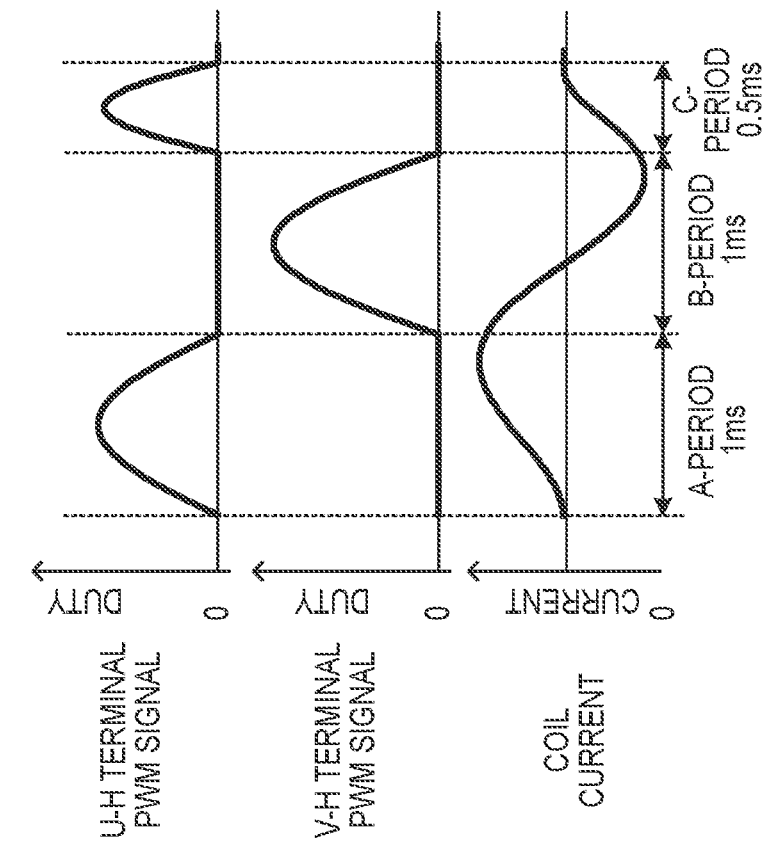

FIG. 7

| No. | #1 | #2 |
|---|---|---|
| 1 | 15 | 30 |
| 2 | 30 | 58 |
| 3 | 45 | 80 |
| 4 | 58 | 95 |
| 5 | 70 | 100 |
| 6 | 80 | 95 |
| 7 | 89 | 80 |
| 8 | 95 | 58 |
| 9 | 98 | 30 |
| 10 | 100 | 0 |
| 11 | 98 | - |
| 12 | 95 | - |
| 13 | 89 | - |
| 14 | 80 | - |
| 15 | 70 | - |
| 16 | 58 | - |
| 17 | 45 | - |
| 18 | 30 | - |
| 19 | 15 | - |
| 20 | 0 | - |

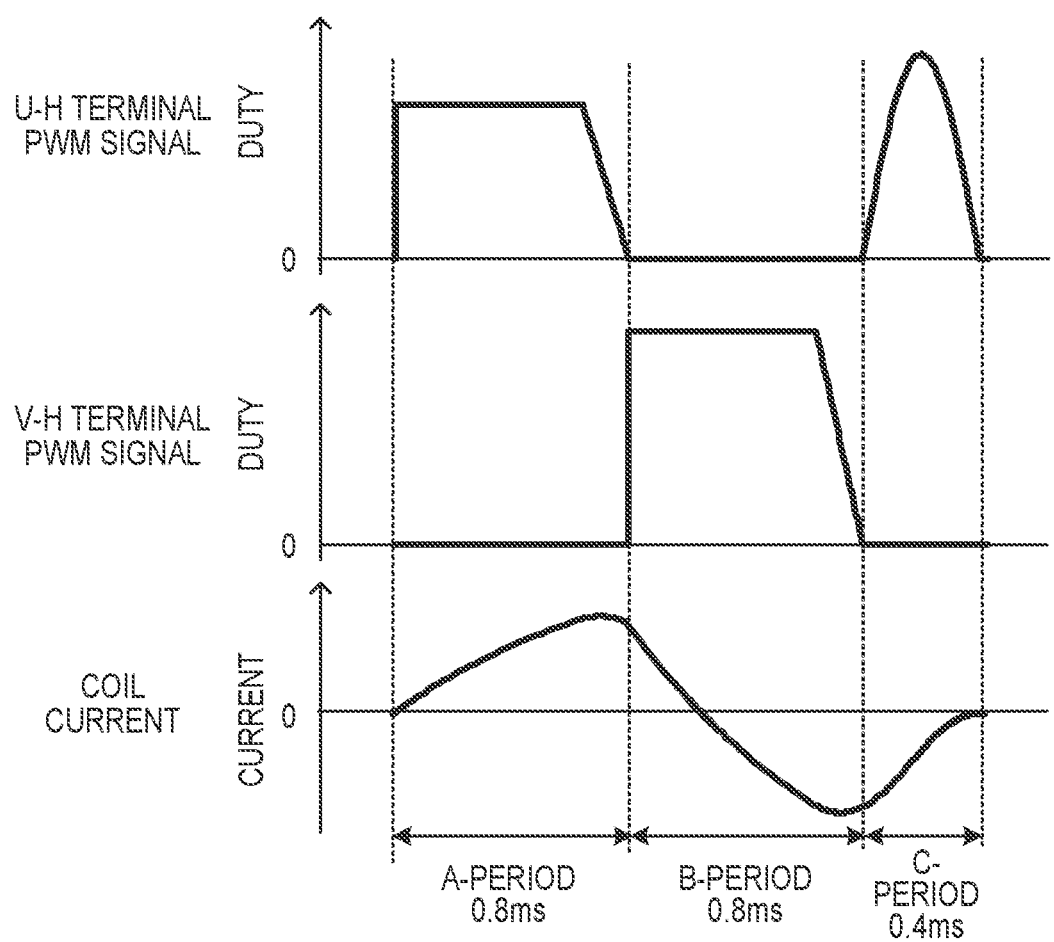

FIG. 13

| No. | #1 | #2 |
|---|---|---|
| 1 | 100 | 38 |
| 2 | 100 | 70 |
| 3 | 100 | 92 |
| 4 | 100 | 100 |
| 5 | 100 | 92 |
| 6 | 100 | 70 |
| 7 | 100 | 38 |
| 8 | 100 | 0 |
| 9 | 100 | - |
| 10 | 100 | - |
| 11 | 100 | - |
| 12 | 100 | - |
| 13 | 75 | - |
| 14 | 50 | - |
| 15 | 25 | - |
| 16 | 0 | - |

MOTOR CONTROL APPARATUS AND IMAGE FORMING APPARATUS FOR DETERMINING STOP POSITION OF ROTOR

BACKGROUND

Field

The present disclosure relates to a technique for controlling a motor.

Description of the Related Art

Sensorless DC brushless motors in which a sensor for detecting a rotor position is not mounted are used as a driving source for a rotation member in an image forming apparatus. In the sensorless DC brushless motors, in order to prevent step-out and inverse rotation at the time of startup, a stop position of a rotor (hereinafter, rotor stop position) is detected, and startup processing based on the rotor stop position is performed. US-2015-0145454 discloses a configuration in which a rotor stop position is detected based on an excitation current (coil current) when a predetermined voltage is applied to a coil.

In order to improve the detection accuracy of a rotor stop position, there is a need to increase a coil current. However, if a coil current is made too large, the rotor may rotate due to the coil current, decreasing the detection accuracy.

SUMMARY

According to an aspect of the present disclosure, a motor control apparatus includes a voltage control unit configured to control a voltage when applied to a plurality of coils of a motor in order to cause a coil current to flow through the plurality of coils, a current detection unit configured to detect the coil current flowing through the plurality of coils, and a control unit configured to determine a stop position of a rotor of the motor by executing measurement processing on sets of coils each consisting of two coils from among the plurality of coils, wherein, when the measurement processing is performed on a set of the sets of coils, the control unit obtains a first detection result from the current detection unit by controlling the voltage control unit to cause the coil current to flow from a first coil of the set to a second coil of the set, then obtains a second detection result from the current detection unit by controlling the voltage control unit to cause the coil current to flow from the second coil of the set to the first coil of the set, and then determines the stop position of the rotor of the motor based on the first detection result and the second detection result obtained for each set on which the measurement processing is performed.

Further features of the present disclosure will become apparent from the following description of exemplary embodiments with reference to the attached drawings.

BRIEF DESCRIPTION OF THE DRAWINGS

FIGS. 4A and 4B are diagrams of a configuration of a motor according to one embodiment.

FIG. 6A is a diagram showing a voltage that is applied to a coil and a coil current according to one embodiment.

FIG. 6B is a diagram showing voltages that are applied to inductance components and the integrated waveform of the voltages, according to one embodiment.

FIG. 7 is a diagram showing time-series data according to one embodiment.

FIG. 12 is a diagram showing a voltage that is applied to a coil and a coil current according to one embodiment.

FIG. 13 is a diagram showing time-series data according to one embodiment.

DESCRIPTION OF THE EMBODIMENTS

Figure 1:
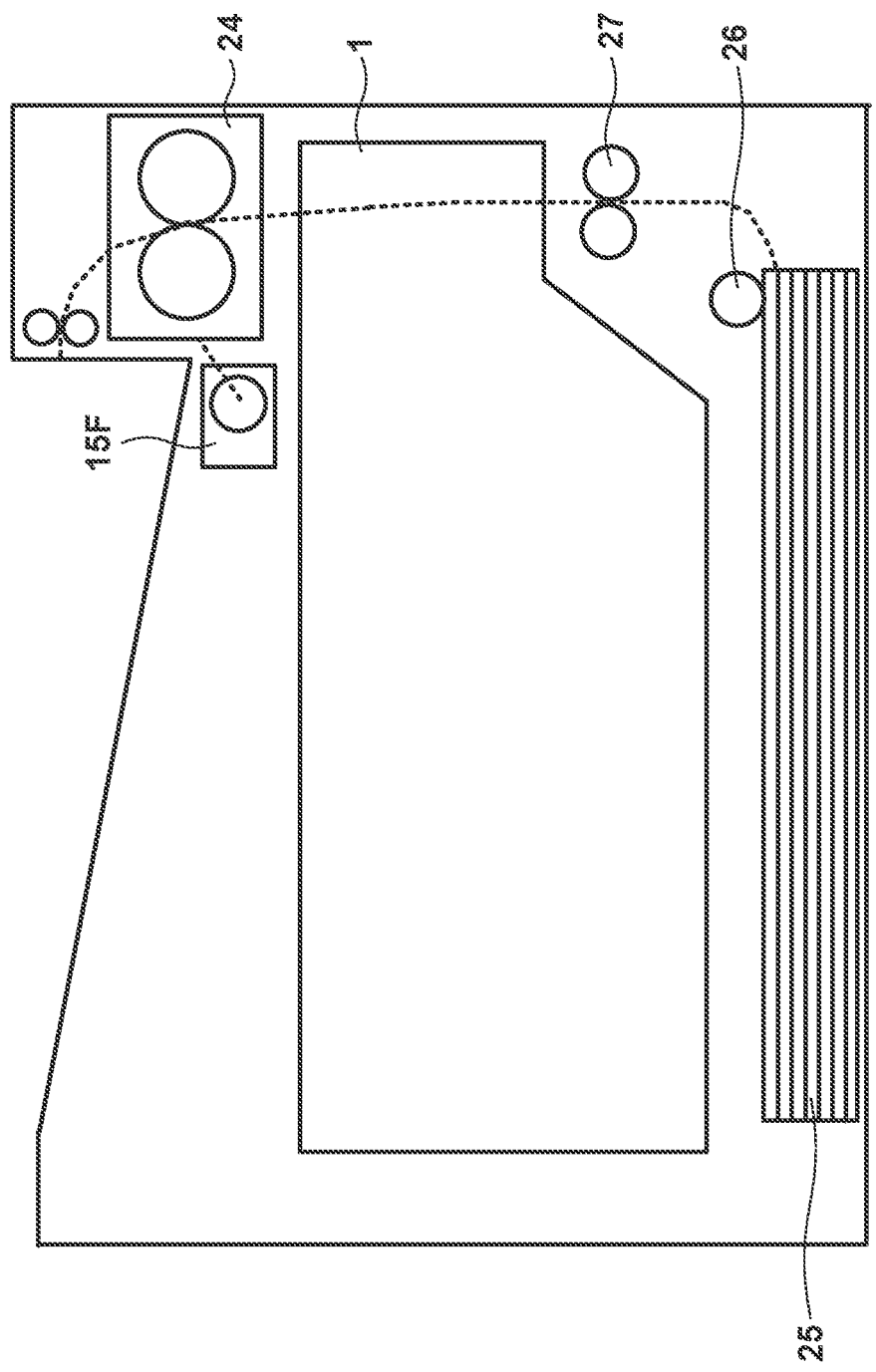
FIG. 1 is a diagram of a configuration of an image forming apparatus according to one embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

FIG. 1 is a diagram of a configuration of an image forming apparatus according to this embodiment. The image forming apparatus may be any of a print apparatus, a printer, a copier, a multifunctional printer, and a fax machine, for example. A sheet stored in a cassette 25 of the image forming apparatus is conveyed along a conveyance path by a feeding roller 26 and conveyance rollers 27. An image forming unit 1 forms yellow, magenta, cyan, and black toner images, and transfers these toner images onto the sheet that is being conveyed on the conveyance path. A fixing device 24 includes a heating roller and a pressing roller, heats/pressurizes the sheet onto which the toner images have been transferred, and fixes the toner images onto the sheet. The sheet subjected to processing for fixing toner images is discharged to the outside of the image forming apparatus. A motor 15F is a driving source for rotating a roller of the fixing device 24.

Figure 2:
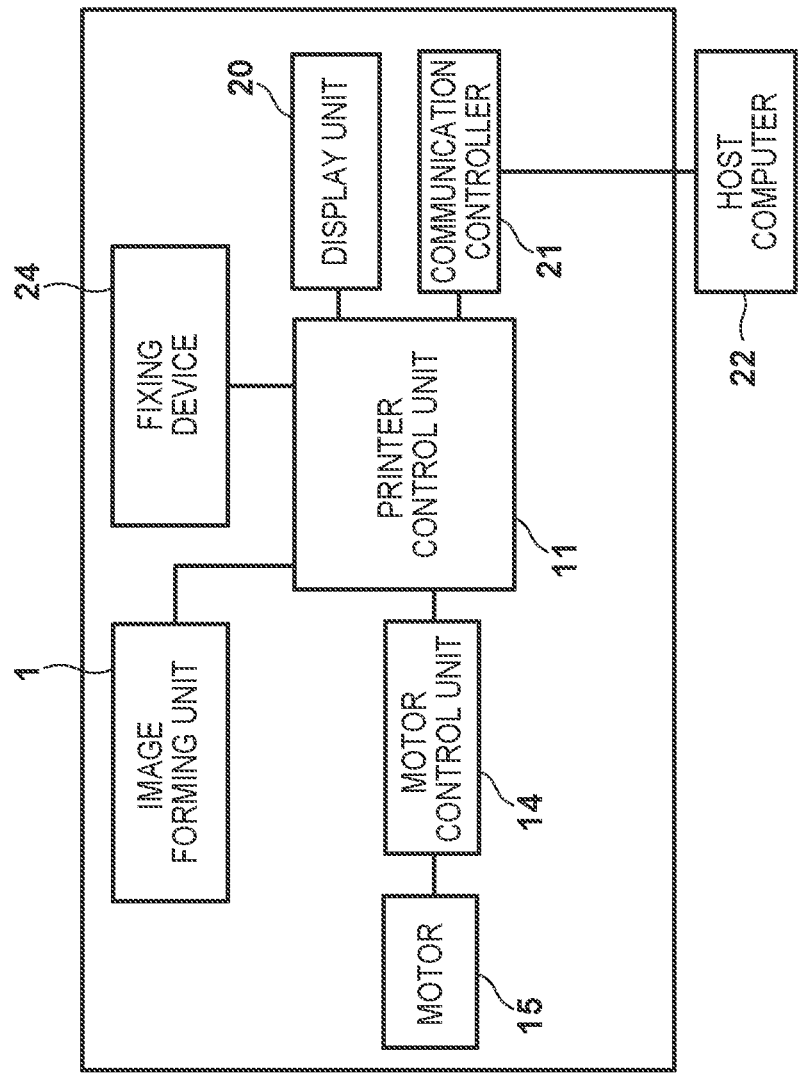
FIG. 2 is a diagram of a control configuration of an image forming apparatus according to one embodiment.

FIG. 2 shows a control configuration of the image forming apparatus. Upon receiving image data of an image that is to be formed, from a host computer 22 via a communication controller 21, a printer control unit 11 controls the image forming unit 1 to form toner images onto a sheet, and controls the fixing device 24 to fix the toner images to the sheet. At this time, the printer control unit 11 also controls a motor control unit 14 to control a motor 15, which includes the motor 15F, to perform conveyance control of the sheet and the like. Also, the printer control unit 11 displays the state of the image forming apparatus on a display unit 20. Note that the printer control unit 11 includes a microcomputer and a memory. The memory stores various control programs and data, and the microcomputer controls the units of the image forming apparatus based on various control programs, data, and the like stored in the memory.

Figure 3:
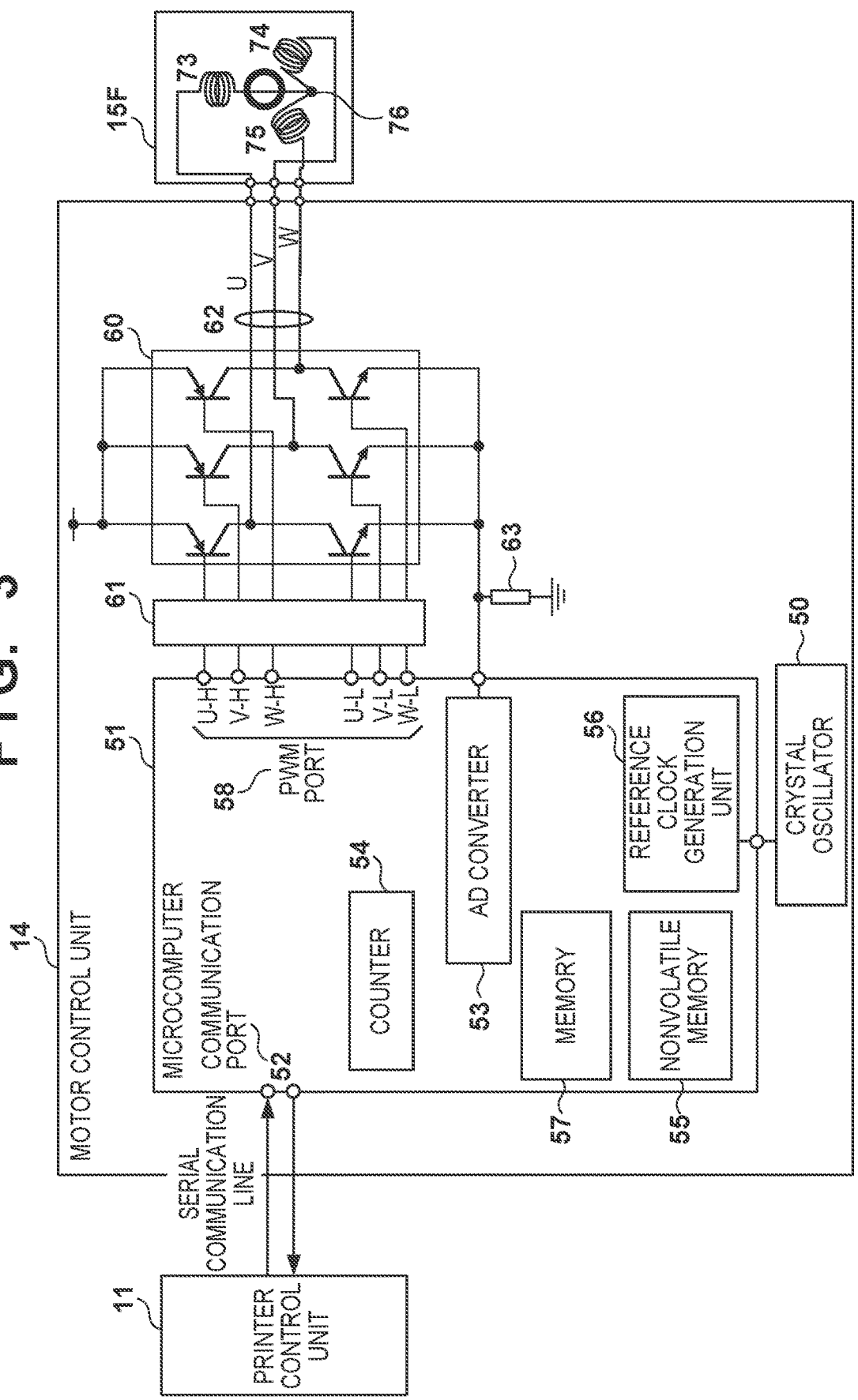
FIG. 3 is a diagram of a configuration of a motor control unit according to one embodiment.

FIG. 3 shows a control configuration of the motor 15F in detail. The motor control unit 14 includes a microcomputer 51. The microcomputer 51 communicates with the printer control unit 11 via a communication port 52. In addition, a reference clock generation unit 56 of the microcomputer 51 is connected to a crystal oscillator 50, and generates a reference clock based on output of the crystal oscillator 50. A counter 54 performs a count operation based on the reference clock. The microcomputer 51 outputs a pulse width modulation signal (PWM signal) from a PWM port 58. In this embodiment, the microcomputer 51 outputs six PWM signals in total, namely PWM signals (U-H, V-H, and W-H) on the "high" side and PWM signals (U-L, V-L, and W-L) on the "low" side for coils of three phases (U phase, V phase, and W phase) of the motor 15F. Thus, the PWM port 58 includes six terminals U-H, V-H, W-H, U-L, V-L, and W-L.

The terminals of the PWM port 58 are connected to a gate driver 61, and the gate driver 61 performs ON/OFF control of switching elements of a three-phase inverter 60 based on PWM signals. Note that the inverter 60 includes six switching elements in total, namely three switching elements on the "high" side and three switching elements on the "low" side in correspondence with the phases, and the gate driver 61 controls the switching elements based on corresponding PWM signals. A transistor or an FET, for example, can be used as a switching element. In this embodiment, if a PWM signal is at a high level, a corresponding switching element is switched on, and if a PWM signal is at a low level, a corresponding switching element is switched off. Output 62 of the inverter 60 is connected to first terminals of coils 73 (U phase), 74 (V phase), and 75 (W phase) of the motor. Note that second terminals that are different from the first terminals of the coils 73, 74, and 75 are connected to each other, and form a neutral point 76.

Therefore, if the switching element on the "high" side of a certain phase is switched on and the switching element on the "low" side of the phase is switched off, the potential of the first terminal of the coil of this phase is defined as a predetermined first potential. On the other hand, if the switching element on the "high" side of a certain phase is switched off and the switching element on the "low" side of this phase is switched on, the potential of the first terminal of the coil of this phase is defined as a second potential that is lower than the first potential. Note that, in this example, the second potential is a ground potential. Therefore, it is possible to control coil currents of the coils 73, 74, and 75 by performing ON/OFF control of the switching elements of the inverter 60. In this manner, the microcomputer 51, the gate driver 61, and the inverter 60 function as a voltage control unit that controls voltages that are applied to the plurality of coils 73, 74, and 75. A coil current flowing through each of the coils 73, 74, and 75 is converted into a voltage by a resistor 63, and is input to an AD converter 53 of the microcomputer 51. The AD converter 53 converts the voltage corresponding to the coil current into a digital value, and the microcomputer 51 detects the current value of the coil current based on this digital value. In this manner, the resistor 63 and the microcomputer 51 that includes the AD converter 53 constitute a current detection unit. In addition, the microcomputer 51 includes a non-volatile memory 55 and a memory 57 that store various types of data and the like that are used for controlling the motor 15F.

FIGS. 4A and 4B are diagrams of a configuration of the motor 15F. The motor 15F includes a six-slot stator 71 and a four-pole rotor 72. The stator 71 includes the coils 73, 74, and 75 of respective phases. The rotor 72 is constituted by permanent magnets, and includes two pairs each consisting of an N-pole and an S-pole. A position at which the rotor 72 stops is determined in accordance with an excitation phase. Note that an excitation phase is indicated by a permutation of two coils from among the plurality of coils 73, 74, and 75. That is to say, there are six excitation phases in total, namely U-V, U-W, V-U, V-W, W-U, and W-V phases. Here, the U-V phase means that a coil current flows from the U-phase coil 73 to the V-phase coil 74 via the neutral point 76. If the U-V phase is excited, for example, the rotor 72 stops at the rotation position shown in FIG. 4A. Note that, at this time, the U phase corresponds to an N-pole, and the V phase corresponds to an S-pole. Next, if the U-W phase is excited, the rotor 72 stops at the rotation position shown in FIG. 4B.

When driving of the motor 15F is stopped and the coil current is decreased to 0, force for holding the rotor 72 does not act, and, when rotative force is applied to the rotor 72 from the outside, the rotor 72 rotates. Therefore, when the fixing device 24 is detached from the image forming apparatus, or, when a sheet stuck in the fixing device 24 due to jam is removed, the rotor 72 may rotate. At this time, the motor control unit 14 loses the stop position of the rotor 72. In addition, even immediately after the power supply of the image forming apparatus is turned on, the motor control unit 14 does not know the stop position of the rotor 72. Therefore, when rotating the motor 15F, the motor control unit 14 first performs processing for determining the stop position of the rotor 72.

Here, in general, a coil such as the coils 73, 74, and 75 has a configuration in which a copper wire is wound around a core obtained by laminating a magnetic steel sheet. When an external magnetic field is present, the magnetic permeability of the magnetic steel sheet decreases. The inductance of a coil is proportional to the magnetic permeability of the core thereof, and thus, when the magnetic permeability of the core decreases, the inductance of the coil also decreases. Only the S-pole of the rotor 72 opposes the U-phase coil 73 in FIG. 4A, for example, and thus the decrease rate of the inductance thereof is higher than that of the W-phase coil 75 that both the S-pole and the N-pole of the rotor 72 oppose. In addition, the change amount of the inductance changes according to whether the direction of a magnetic field that is caused by a coil current and the direction of the external magnetic field are the same or opposite. Specifically, in the state in FIG. 4A, when the direction of the magnetic field generated by the U-phase coil 73 is the same as the direction of the magnetic field generated by the opposing S-pole of the rotor 72, in other words, a coil current flows through the U-phase coil 73 such that the U-phase corresponds to an N-pole, the decrease rate of the inductance increases compared with a case where a coil current flows such that the U-phase corresponds to an S-pole. In this manner, an inductance that is detected varies in accordance with a stop position of the rotor 72 and an excitation phase. In addition, iron loss of a coil changes as a result of the inductance thereof changing, and thus the resistance component of the coil also changes. That is to say, an impedance of a coil changes in accordance with a stop position of the rotor 72 and an excitation phase.

Figure 5:
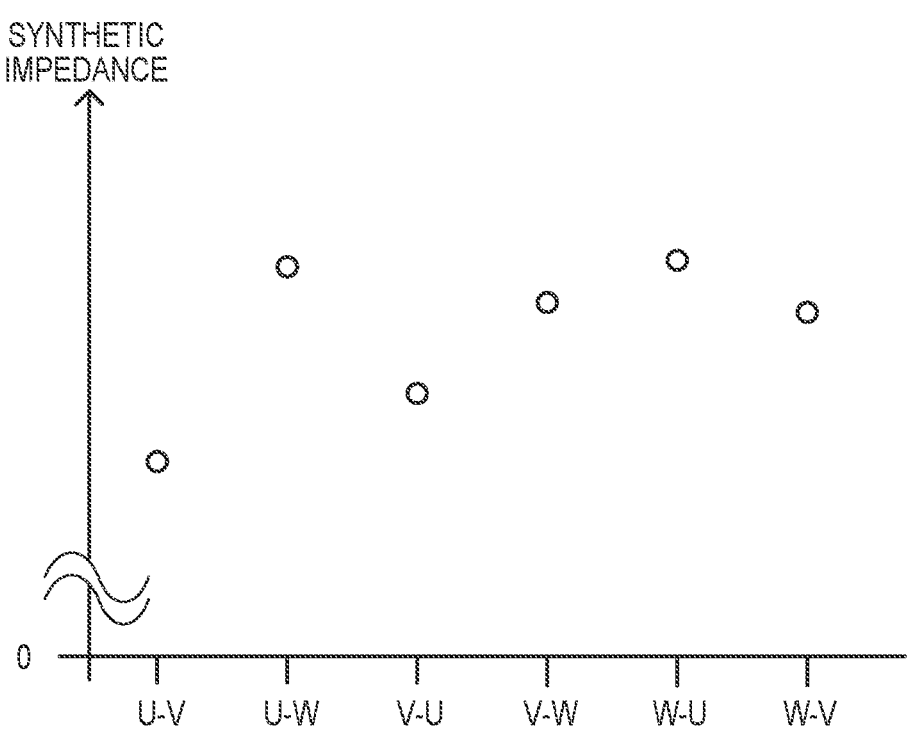
FIG. 5 is a diagram showing the relation between an excitation phase and a synthetic impedance according to one embodiment.

FIG. 5 shows an example of a synthetic impedance when each excitation phase is excited while the rotor 72 is stopped. Note that, in FIG. 5, it is assumed that the rotor 72 is stopped at a position where the rotor 72 stops when the U-V phase is exited. Hereinafter, a position at which the rotor 72 stops when an X-Y phase is excited is indicated by "the position of the X-Y phase". The rotor 72 is stopped at the position of the U-V phase, and thus the synthetic impedance when the U-V phase is excited is smaller than a synthetic impedance when other phases are excited. A synthetic impedance can be determined based on the magnitude of a coil current or the speed of rise in the coil current when each of the six excitation phases is excited. Therefore, it is possible to determine the stop position of the rotor 72 by exciting the six excitation phases and determining relative magnitude relation between the synthetic impedances.

Here, in this embodiment, two excitation phases that include two same phases from among the six excitation phases are defined as one set. Two excitation phases in one set are sequentially excited is one measurement process. Specifically, an "X-Y phase" and a "Y-X phase" make up one set, and the X-Y phase and the Y-X phase are excited in one measurement process. Note that the motor 15F in this embodiment has three phases (U phase, V phase, and W phase), and thus the number of sets is three. Therefore, in this embodiment, in order to determine a rotor stop position, the measurement process is performed three times for the respective sets.

The one measurement process will be described below with reference to FIGS. 6A and 6B, using a set consisting of the U-V phase and V-U phase as an example. Note that, in FIG. 6A, the U-V phase is excited, and the V-U phase is then excited. In addition, the coil current in FIG. 6A takes a positive current value when a current flows from the U-phase coil 73 toward the V-phase coil 74. First, during an A period, the V-H terminal of the PWM port 58 is fixed at a low level, and a PWM signal whose duty cycle temporally changes is output from the U-H terminal. Note that, during the A period, the V-L terminal is fixed at a high level, and other terminals are fixed at the low level. Therefore, during the A period, the first terminal of the U-phase coil 73 corresponds to a first potential while the PWM signal is at the high level. On the other hand, during the A period, the first terminal of the V-phase coil 74 corresponds to a second potential (ground potential) that is lower than the first potential. Note that, to be specific, the potential of the first terminal of the V-phase coil 74 changes from the second potential due to the coil current flowing through the resistor 63, but this change is sufficiently small compared with the first potential, and thus can be ignored. Note that, as shown in FIG. 6A, during the A period, the duty cycle of the PWM signal that is output from the U-H terminal is changed in a sine waveform. A half cycle of a sine wave of this corresponds to the length of the A period, and the maximum value of the duty cycle is 65% in this example.

During a B period that follows the A period, the U-H terminal is fixed at the low level, and the duty cycle of a PWM signal that is output from the V-H terminal is changed in a sine waveform, and a U-L terminal is fixed at the high level. A half cycle of a sine wave of this corresponds to the length of the B period, and the maximum value of the duty cycle is 90% in this example. Therefore, during the B period, the potential of the first terminal of the V-phase coil 74 temporally changes in accordance with the PWM signal. On the other hand, during the B period, the potential of the first terminal of the U-phase coil 73 does not temporally change. Note that, during the B period, terminals other than those described above are fixed at the low level. During a C period, a signal that is output from a PWM terminal of the PWM port 58 is similar to that during the A period. Note that the maximum value of the duty cycle of the PWM signal that is output from the U-H terminal does not need to be the same as that of the A period, and is 62% in this example.

By performing excitation as described above, during the A period, a coil current flows from the U-phase coil 73 to the V-phase coil 74. Note that, at the end point of the A period, a coil current still flows from the U-phase coil 73 toward the V-phase coil 74 due to an inductance component. During the B period, a voltage is applied such that a coil current flows from the V-phase coil 74 toward the U-phase coil 73, and thus at a certain point of time in the B period, the direction of the coil current is reversed, and a coil current flows from the V-phase coil 74 to the U-phase coil 73. Note that, at the end point of the B period, a coil current still flows from the V-phase coil 74 toward the U-phase coil 73 due to an inductance component. The C period is a period for decreasing the coil current flowing from the V-phase coil 74 toward the U-phase coil 73 to 0. In this manner, the U-V phase is excited from the beginning of the A period until a timing when a coil current decreases to 0 during the B period, and the V-U phase is excited from the timing in the B period until the end of the C period.

The time length of the A period and the duty maximum value during the A period are determined so as to satisfy a condition that the rotor 72 does not rotate and a condition that it is possible to distinguish a difference in synthetic impedance that is detected when each excitation phases is excited. In this example, the time length of the A period and the maximum value of the duty cycle are respectively 1 ms and 65%. In addition, the maximum value of the duty cycle during the B period is a value obtained by adding a predetermined offset value to the maximum value of the duty cycle during the A period. This predetermined offset value is set such that a time integrated value of a voltage produced in the inductance component of the coil during the A period is decreased to substantially zero. That is to say, the maximum value of the duty cycle during the B period is determined based on a voltage waveform that is applied to the inductance component of the coil during the A period. In this example, the offset value is 25%, and thus, the maximum value of the duty cycle during the B period is 90%. By adding this offset value, it is possible to cancel the influence of a coil current flowing from the U-phase coil 73 in a direction of the V-phase coil 74 before the V-U phase is excited. Note that, in this example, the time length of the B period is 1 ms, which is the same as the time length of the A period. Furthermore, the time length of the C period and the maximum value of the duty cycle are the set such that a time integrated value of a voltage produced in the inductance component of each coil from the start of A period until the end of the C period is decreased to substantially zero. That is to say, the time length of the C period and the maximum value of the duty cycle are determined based on a voltage waveform that is applied to the coils during the A period and the B period. In this example, the time length of the C period and the maximum value of the duty cycle are respectively 0.5 ms and 62%.

FIG. 6B shows, on the upper side thereof, a voltage that is applied to the coil row of the U phase and the V phase and a voltage VL that is added to inductance components of the coils when a voltage is applied as shown in FIG. 6A. In addition, FIG. 6B shows, on the lower side thereof, a waveform obtained by time-integrating the waveform of the voltage VL. Note that the voltage waveform on the upper side indicates the average voltage by one pulse period step that is applied to the coil row of the U phase and the V phase when the duty cycles of the PWM signals are changed in a sine waveform, as shown in FIG. 6A. That is to say, for example, when a PWM signal is constantly high during one pulse period, a voltage that is applied to the coil row corresponds to (first potential−second potential), and, when the PWM signal is high only during the period of a half of one pulse, the voltage that is applied to the coil row corresponds to (first potential−second potential)/2. The voltage VL changes from the voltage applied to the coil, due to a voltage drop and a counter electromotive voltage caused by resistance of the coil. The time-integrated waveform of the voltage VL increases while the voltage VL is positive during the A period. After the voltage VL changes to a negative voltage during the A period, the time-integrated waveform of the voltage VL decreases, and reaches 0 at a certain point of time during the B period. Thereafter, the time-integrated waveform of the voltage VL increases and then decreases, and reaches substantially zero at the end point of the C period.

By applying a voltage to the coil row as shown in FIG. 6A, the U-V phase and V-U phase can be excited in one measurement process. Therefore, it is possible to detect a synthetic impedance when the U-V phase and V-U phase are excited in one measurement process. In addition, detection of the U-V phase and the V-U phase is sequentially performed in one measurement processing, and thus it is possible to cancel torque caused by excitation of the U-V phase and acting on the rotor 72, by exciting the V-U phase, and to keep the rotor 72 from rotating. As described above, in this embodiment, there are three sets of excitation phases, and thus the motor control unit 14 can detect synthetic impedances when the six excitation phases are excited, by performing the above measurement processing three times.

In this embodiment, time-series data for changing a duty cycle in a sine waveform is created in advance and stored in the non-volatile memory 55. FIG. 7 shows an example of time-series data. Note that the time-series data in FIG. 7 is data by 50 µs step. "#1" in FIG. 7 indicates basic data for the A period and the B period. The time lengths of the A period and the B period are each 1 ms, and thus 20 pieces of data are included. On the other hand, "#2" in FIG. 7 indicates basic data for the C period. The C period is 0.5 ms, and thus 10 pieces of data are included. In each of the periods, the motor control unit 14 uses a value obtained by multiplying corresponding basic data by a predetermined coefficient (hereinafter, referred to as a "duty coefficient"). In this example, a duty coefficient is the maximum value of the duty cycle. Specifically, the duty coefficients of the A period, the B period, and the C period are respectively 0.65, 0.9, and 0.62. Note that information indicating the duty coefficients is stored in the non-volatile memory 55 of the motor control unit 14 in advance.

While the measurement process is being performed on the set of the X-Y phase and the Y-X phase, the motor control unit 14 detects a coil current for each predetermined period, and stores the detected coil currents as measured current values in the memory 57. The predetermined period is 50 µs, for example. When the measurement process ends, the motor control unit 14 determines the maximum measured value $M_{X-Y}$ and the maximum measured value $M_{Y-X}$ as detection results in the measurement process, based on a plurality of measured current values that have been stored. The maximum measured value $M_{X-Y}$ is the maximum value of a measured current value (absolute value) of a coil current that flows from the X-phase coil toward the Y-phase coil. Similarly, the maximum measured value $M_{Y-X}$ is the maximum value of a measured current value (absolute value) of a coil current that flows from the Y-phase coil toward the X-phase coil. As described above, by executing the measurement process on three sets of excitation phases, the motor control unit 14 obtains the maximum measured values $M_{U-V}$, $M_{V-U}$, $M_{U-W}$, $M_{W-U}$, $M_{V-W}$, $M_{W-V}$ that are measurement results of the six excitation phases.

Figure 8:
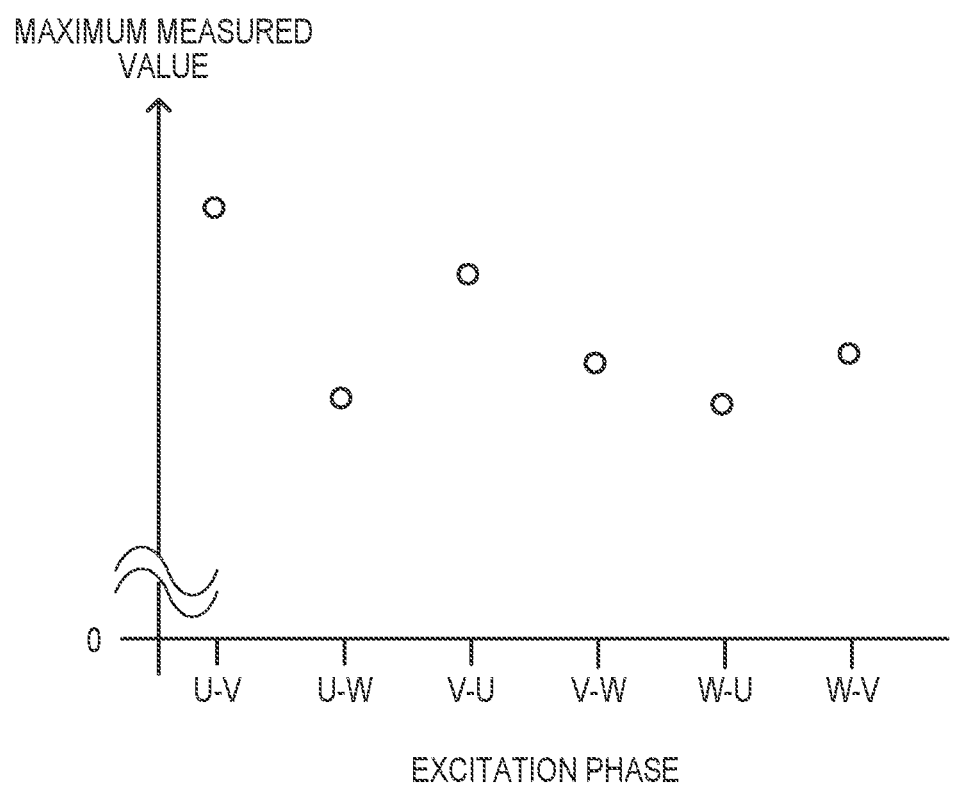
FIG. 8 is a diagram showing excitation phases and the maximum measured values, according to one embodiment.

FIG. 8 shows an example of the maximum measured values of the six excitation phase. In the example shown in FIG. 8, the maximum measured value when the U-V phase is excited is largest, which indicates that a synthetic impedance when the U-V phase is excited is smallest. Therefore, it is possible to determine that the rotor 72 is stopped at the position of the U-V phase.

Figure 9:
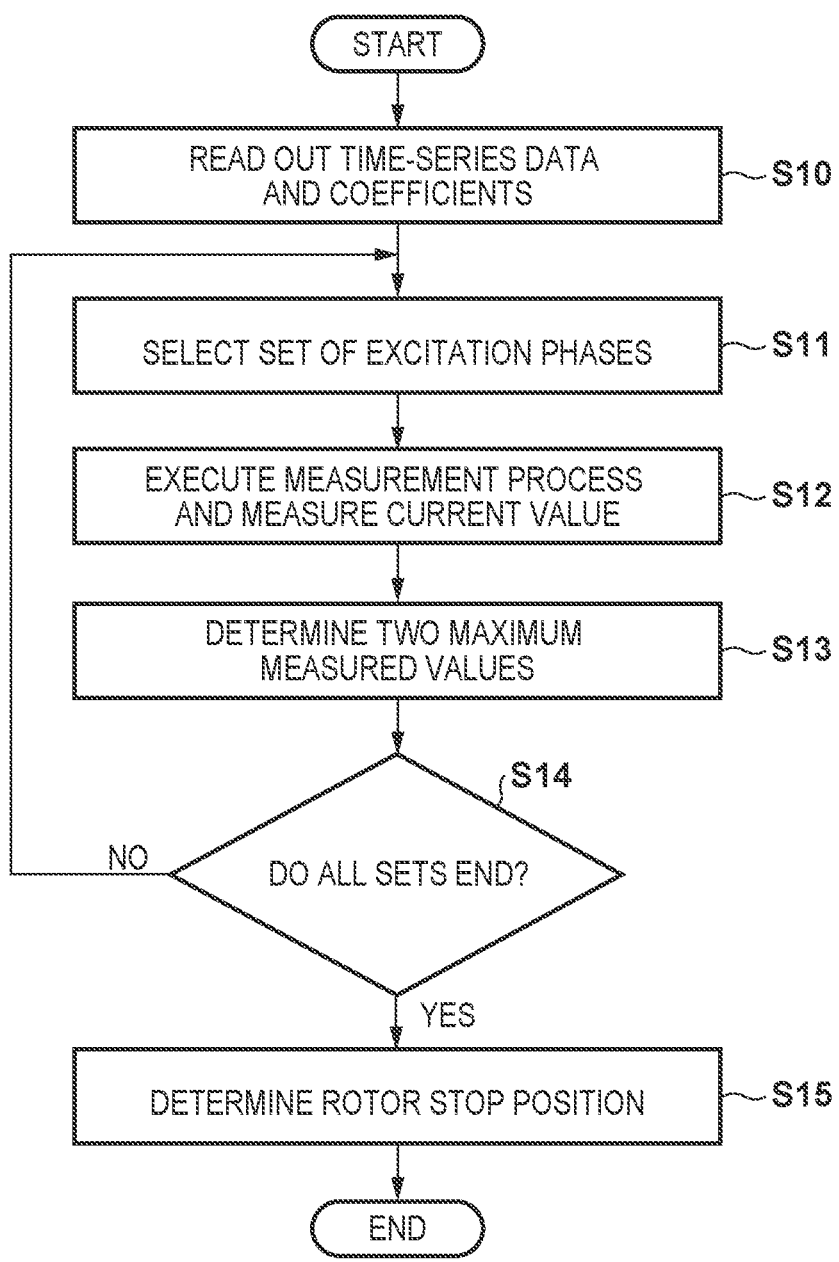
FIG. 9 is a flowchart of processing for determining a rotor stop position according to one embodiment.

FIG. 9 is a flowchart of processing for determining a rotor stop position that is executed by the motor control unit 14. In step S10, the motor control unit 14 reads out time-series data and duty coefficients for the respective periods such as those shown in FIG. 7, from the non-volatile memory 55, and determines PWM signals that are output from the PWM port 58 in the measurement process. In step S11, the motor control unit 14 selects a set of excitation phases on which the measurement process is to be executed. In step S12, the motor control unit 14 executes the measurement process on the selected set, and stores the measured current values in the memory 57. When the measurement process performed on the selected set ends, the motor control unit 14 determines, in step S13, the maximum measured values of the two excitation phases in the selected set, and stores the values in the memory 57. In step S14, the motor control unit 14 then determines whether or not the measurement process has been executed on all of the sets, and if the process has not been executed on all of the sets, the motor control unit 14 repeats the processing from step S11. On the other hand, if the measurement process has been executed on all of the sets, the motor control unit 14 determines the stop position of the rotor 72 based on the maximum measured values of the excitation phases in step S15.

An initial value of a duty coefficient is determined based on a standard parameter of the motor 15F in advance. However, it is desirable that correction is made to a more optimum value in accordance with variations in the individual characteristics of the motor 15F. Therefore, in this embodiment, update processing for correcting/updating the duty coefficient that is used during the B period is performed.

First, the concept of a method for correcting and updating the duty coefficient during the B period that is used for the measurement process that is performed on a set of an X-Y phase and an Y-X phase will be described. First, the above-described measurement process is performed such that the X-Y phase is first excited and the Y-X phase is then excited, and a maximum measured value $M_{X-Y}$ (hereinafter, a "first maximum measured value") is determined. Subsequently, the above-described measurement process is performed such that the Y-X phase is first excited and the X-Y phase is then excited, and a maximum measured value $M_{X-Y}$ (hereinafter, a "second maximum measured value") is determined. The first maximum measured value is a maximum value of a coil current when there is no influence from a previous coil current. On the other hand, the second maximum measured value is a maximum value of a coil current when there is the influence of a coil current that previously flowed from the Y-phase coil toward the X-phase coil. Irrespective of the order in which excitation phases are excited in one measurement process, the maximum measured values need to be the same. That is to say, the first maximum measured value and the second maximum measured value need to be the same. Therefore, in this embodiment, the duty coefficient for the B period is corrected such that the first maximum measured value and the second maximum measured value are equal.

Figure 10:
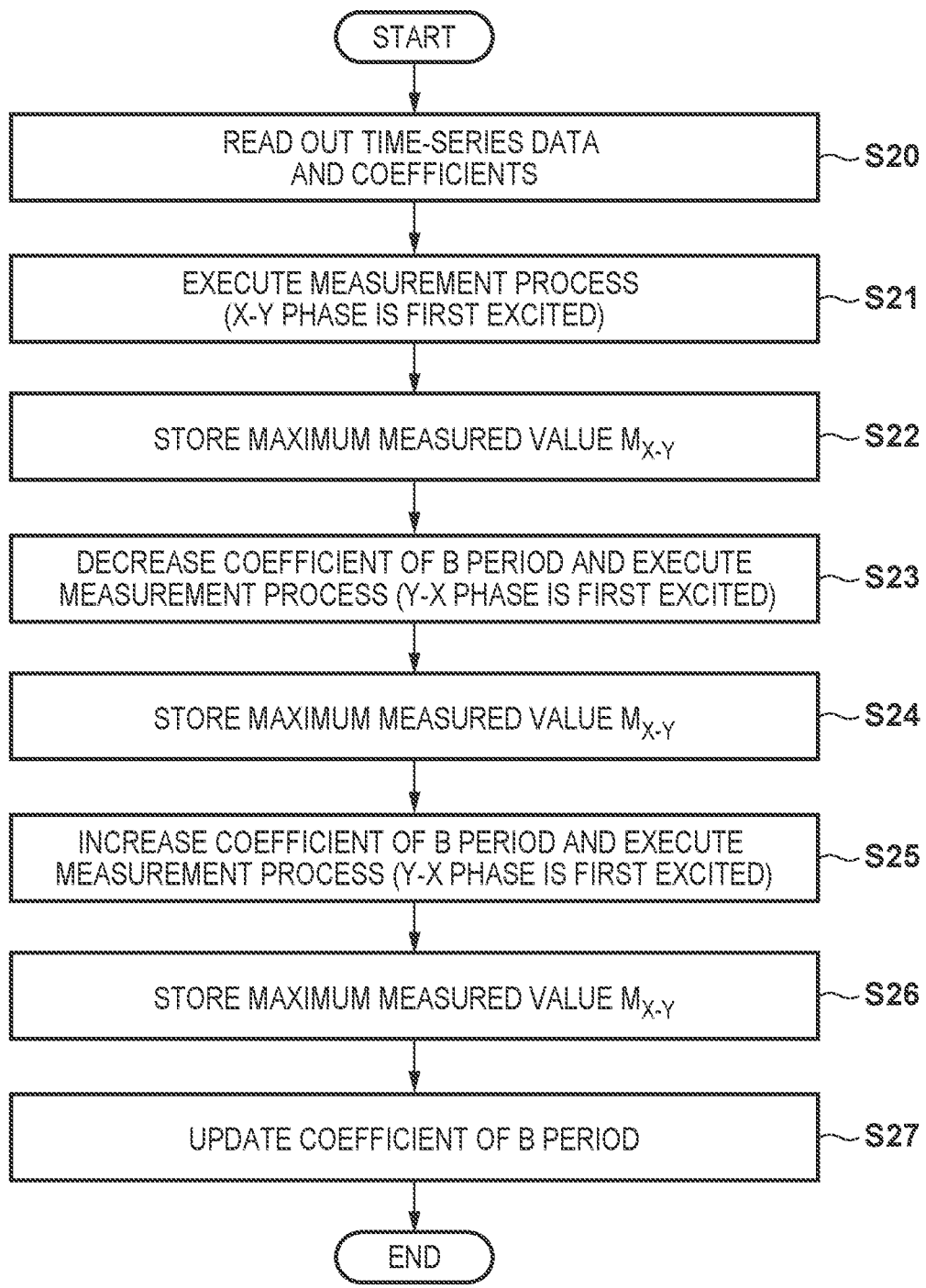
FIG. 10 is a flowchart of coefficient update processing according to one embodiment.

FIG. 10 is a flowchart of processing for updating a duty coefficient that is executed by the motor control unit 14. In step S20, the motor control unit 14 reads out time-series data such as those shown in FIG. 7 and the duty coefficients for the respective periods at the present point of time, from the non-volatile memory 55, and determines PWM signals that are output from the PWM port 58. In step S21, the motor control unit 14 executes the measurement process on the set of the X-Y phase and the Y-X phase. Note that, at this time, the X-Y phase is first excited, and the Y-X phase is then excited. After the measurement process ends, in step S22, the motor control unit 14 determines and stores the maximum measured value $M_{X-Y}$.

Subsequently, in step S23, the motor control unit 14 executes the measurement process on the same set. Note that, regarding an excitation phase that is first excited, the order in step S21 is reversed, and the Y-X phase is first excited. In addition, the duty coefficient for the B period is set smaller than the duty coefficient at the present point of time. As an example, the duty coefficient obtained by multiplying the duty coefficient for the B period at the present point of time by 0.95 is used during the B period. Therefore, for example, if the duty coefficient for the B period at the present point of time is 0.9, the duty coefficient for the B period is set to 0.85 in the measurement process that is executed in step S23. After the measurement process ends, the motor control unit 14 determines and stores the maximum measured value $M_{X-Y}$, in step S24.

Subsequently, in step S25, the motor control unit 14 executes the measurement process on the same set. Note that, regarding an excitation phase that is first excited, the order in step S21 is reversed, and the Y-X phase is first excited. In addition, the duty coefficient for the B period is set larger than the duty coefficient at the present point of time. As an example, a duty coefficient obtained by multiplying the duty coefficient for the B period at the present point of time by 1.05 is used during the B period. Therefore, for example, if the duty coefficient for the B period at the present point of time is 0.9, the duty coefficient for the B period is set to 0.945 in the measurement process that is executed in step S25. After the measurement process ends, the motor control unit 14 determines and stores the maximum measured value $M_{X-Y}$, in step S26.

In step S27, the motor control unit 14 updates the duty coefficient for the B period based on the maximum measured values in steps S22, S24, and S26. The maximum measured value in step S24 is denoted by M1, the maximum measured value in step S26 is denoted by M2, and the maximum measured value in step S22 is denoted by M3, for example. In addition, the duty coefficient for the B period used in step S23 is denoted by D1, and the duty coefficient for the B period used in step S25 is denoted by D2. In this case, the motor control unit 14 obtains the relation between the duty coefficient for the B period and the maximum measured value based on the duty coefficients D1 and D2 and the maximum measured values M1 and M2. The duty coefficient D3 for the B period for which the maximum measured value becomes M3 is then determined based on this relation. The motor control unit 14 then updates, to D3, the duty coefficient for the B period for the set of the X-Y phase and the Y-X phase.

In this manner, by updating the duty coefficient, even if two excitation phases included in a set of excitation phases are excited sequentially, it is possible to accurately determine the stop position of the rotor 72. Note that the processing of steps S21 and S22 in the flowchart in FIG. 10, the processing of steps S23 and S24, and the processing of steps S25 and S26 may be performed in any order. In addition, the result of processing for determining the stop position of the rotor 72 can be used in the processing of steps S21 and S22. That is to say, in this case, in update processing shown in FIG. 10, steps S21 and S22 are not executed, and the result of processing for determining the stop position of the rotor 72 that was performed last time is used. In addition, in this embodiment, a value larger than and a value smaller than the current duty coefficient are used as the duty coefficients for the B period in steps S23 and S25. However, one of the two can also take the same value as the current duty coefficient. In addition, for example, a configuration may also be adopted in which, steps S25 and S26 are omitted, and, in step S23 to S24, one maximum measured value $M_{X-Y}$ is measured using the current duty coefficient, for example. In this case, for example, a configuration can be adopted in which the magnitude relation between the maximum measured value $M_{X-Y}$ obtained in step S22 and the maximum measured value $M_{X-Y}$ obtained in step S24 is determined, and the duty coefficient is increased/decreased by a predetermined value in accordance with the magnitude relation. In addition, instead of using the predetermined value as a value by which the duty coefficient is increased/decreased in accordance with the magnitude relation, a configuration can also be adopted in which the duty coefficient is increased/decreased in accordance with the difference between the maximum measured value $M_{X-Y}$ obtained in step S22 and the maximum measured value $M_{X-Y}$ obtained in step S24. Furthermore, in this embodiment, the duty coefficient for the B period is updated based on the duty coefficient for the A period, but the duty coefficient for the A period can also be updated based on the duty coefficient for the B period.

Figure 11A:
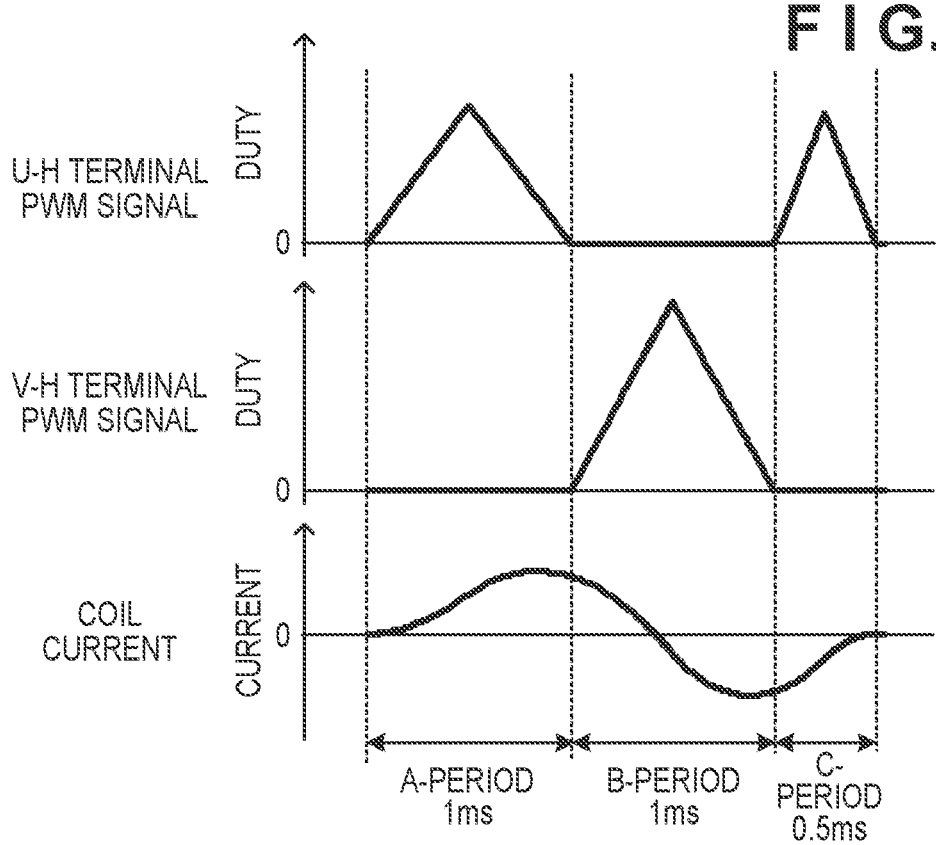
FIGS. 11A and 11B are diagrams illustrating a voltage that is applied to a coil and a coil current according to one embodiment.
Figure 11B:
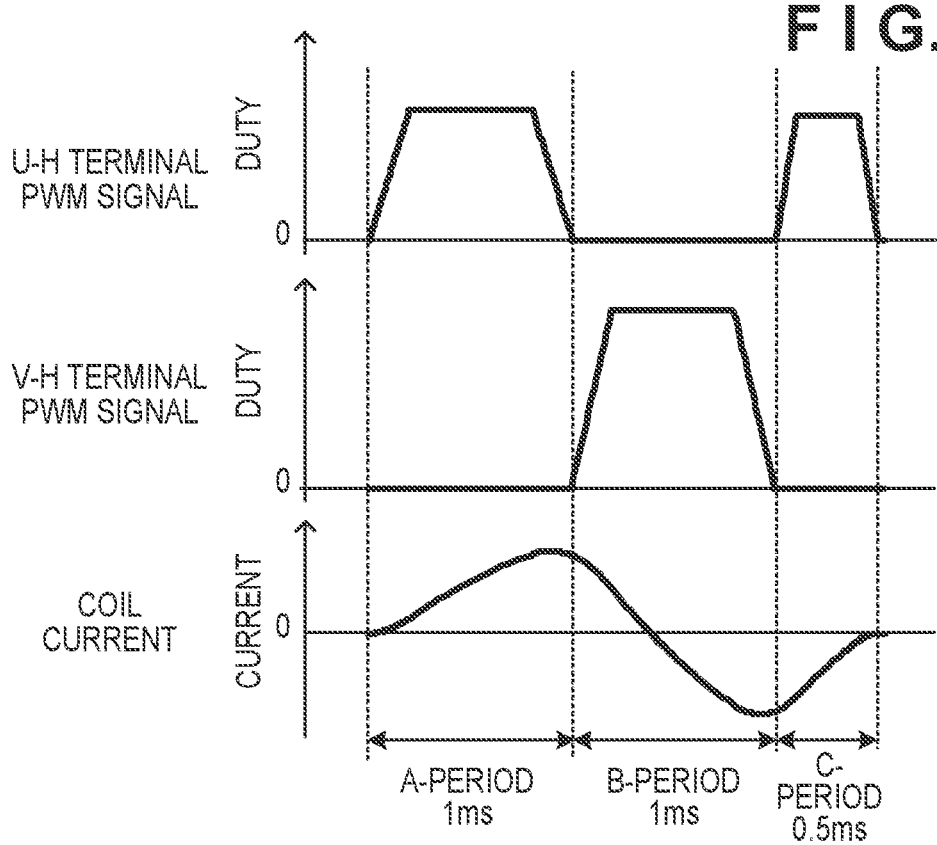

In addition, in this embodiment, as shown in FIG. 6A, the duty cycle of a PWM signal is changed in a sine waveform in the measurement process. However, the present disclosure is not limited to changing the duty cycle of a PWM signal in a sine waveform. As shown in FIG. 11A, for example, a duty cycle can be changed in a triangular waveform. Alternatively, as shown in FIG. 11B, a duty cycle can also be changed in a trapezoid waveform. Furthermore, although not illustrated, a duty cycle can also be changed in a rectangular waveform. More generally, the shape of a voltage waveform that is applied to a coil is 0 at the time of the start and the end of each period, and increases toward a maximum value, and decreases toward 0 when it reaches the maximum value, or at any timing after that, during each period. In addition, the shapes of change in duty cycles of PWM signals during the A period, the B period, and the C period do not need to be the same.

Second Embodiment

Next, a second embodiment will be described with focus on differences from the first embodiment. In this embodiment, a method for applying a voltage to a coil is different from that in the first embodiment. FIG. 12 shows temporal changes of the duty cycles of PWM signals that are output from the PWM port 58, in the measurement process for exciting the set of the U-V phase and V-U phase. The A period and the B period are each 0.8 ms. At the start timing of the A period, the duty cycle of a PWM signal that is output from the U-H terminal is raised to a maximum value thereof, and the duty cycle of the PWM signal is then maintained at the maximum value during a predetermined period. When the predetermined period elapses, the duty cycle of the PWM signal output from the U-H terminal is decreased so as to reach 0 at the end timing of the A period. In addition, during the B period, a PWM signal that is similar to the PWM signal that is output from the U-H terminal during the A period is output from the V-H terminal. The C period is 0.4 ms, and, similarly to the first embodiment, a PWM signal whose duty cycle changes in a sine waveform is output from the U-H terminal. Note that, in this example, the maximum values of the duty cycles for the A period, the B period, and the C period are respectively 65%, 90%, and 87%. During the A period to the C period, a signal that is output from another terminal (not illustrated) is similar to that in the first embodiment.

The time lengths of the A period and the B period are determined based on required detection accuracy, using a period during which the rotor 72 does not rotate as an upper limit. In this example, the time lengths of the A period and the B period are each 0.8 ms. In addition, the time length of the C period and the maximum value of the duty cycle are set such that the time integrated value of a voltage produced in the inductance component of a coil during the A period, the B period, and the C period is substantially zero, similarly to the first embodiment. FIG. 13 shows time-series data of duty cycles that are used for the A, B, and C periods. The duty coefficients for the A, B, and C periods are respectively 0.65, 0.9, and 0.87.

Processing for detecting a rotor stop position and a method for correcting a duty coefficient according to this embodiment are similar to those in the first embodiment, and thus a description thereof is omitted.

As described above, in this embodiment, by raising the duty cycles for the A and B periods in a rectangular waveform, the current value can be raised to a current value required for satisfying the detection accuracy, in a short time. In addition, by decreasing a duty cycle with a predetermined inclination, a change in the current is made moderate. With this configuration, it is possible to shorten a time required for processing for detecting a rotor stop position, and to suppress generation of abnormal noise.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-092510, filed Jun. 1, 2021 which is hereby incorporated by reference herein in its entirety.

What is claimed is:

1. A motor control apparatus comprising:
a voltage control unit configured to control a voltage when applied to a plurality of coils of a motor in order to cause a coil current to flow through the plurality of coils;
a current detection unit configured to detect the coil current flowing through the plurality of coils; and
a control unit configured to determine a stop position of a rotor of the motor by executing measurement processing on sets of coils each consisting of two coils from among the plurality of coils,
wherein, when the measurement processing is performed on a set of the sets of coils, the control unit obtains a first detection result from the current detection unit by controlling the voltage control unit to cause the coil current to flow from a first coil of the set to a second coil of the set, then obtains a second detection result from the current detection unit by controlling the voltage control unit to cause the coil current to flow from the second coil of the set to the first coil of the set, and then determines the stop position of the rotor of the motor based on the first detection result and the second detection result obtained for each set on which the measurement processing is performed.

2. The motor control apparatus according to claim 1,
wherein the measurement processing includes a first period, a second period that follows the first period, and a third period that follows the second period, and
wherein, during a period until a certain point in time during the second period, the coil current flows from the first coil toward the second coil and, during a period after the certain point in time, the coil current flows from the second coil toward the first coil.

3. The motor control apparatus according to claim 2,
wherein the control unit is further configured to:
during the first period, control the voltage control unit such that a potential of a first terminal of the first coil that is different from a terminal that is connected to the second coil is higher than a potential of a second terminal of the second coil that is different from a terminal that is connected to the first coil,
during the second period, control the voltage control unit such that a potential of the second terminal is higher than a potential of the first terminal, and
during the third period, control the voltage control unit such that a potential of the first terminal is higher than a potential of the second terminal.

4. The motor control apparatus according to claim 3, wherein the control unit is further configured to control the voltage control unit such that a pulse width modulation signal is applied to the first terminal during the first period and the third period and the pulse width modulation signal is applied to the second terminal during the second period.

5. The motor control apparatus according to claim 4, wherein, during the first period and the third period, the control unit is further configured to change a duty cycle of the pulse width modulation signal when applied to the first terminal, and, wherein, during the second period, the control unit is further configured to change a duty cycle of the pulse width modulation signal when applied to the second terminal.

6. The motor control apparatus according to claim 5, wherein, during the first period, the control unit is further configured to change the duty cycle of the pulse width modulation signal when applied to the first terminal, in a sine waveform, a triangular waveform, or a trapezoid waveform, wherein, during the second period, the control unit is further configured to change the duty cycle of the pulse width modulation signal when applied to the second terminal, in a sine waveform, a triangular waveform, or a trapezoid waveform, and, wherein, during the third period, the control unit is further configured to change the duty cycle of the pulse width modulation signal when applied to the first terminal, in a sine waveform, a triangular waveform, or a trapezoid waveform.

7. The motor control apparatus according to claim 5, wherein the duty cycle of the pulse width modulation signal when applied to the first terminal during the first period is 0 at an end timing of the first period, the duty cycle of the pulse width modulation signal when applied to the second terminal during the second period is 0 at an end timing of the second period, and the duty cycle of the pulse width modulation signal when applied to the first terminal during the third period is 0 at a start timing and an end timing of the third period.

8. The motor control apparatus according to claim 5, further comprising a storing unit configured to store information indicating a first maximum value indicating a maximum value of the duty cycle of the pulse width modulation signal during the first period, a second maximum value indicating a maximum value of the duty cycle of the pulse width modulation signal during the second period, and a third maximum value indicating a maximum value of the duty cycle of the pulse width modulation signal during the third period, wherein the control unit is further configured to change the duty cycle of the pulse width modulation signal during the first period, the second period, and the third period in accordance with the first maximum value, the second maximum value, and the third maximum value, respectively.

9. The motor control apparatus according to claim 8, wherein the second maximum value is larger than the first maximum value.

10. The motor control apparatus according to claim 8, wherein the control unit is further configured to control the voltage control unit to cause the coil current to flow from the second coil toward the first coil, and then execute update processing for updating the second maximum value such that a third detection result from the current detection unit approaches the first detection result, where the third detection result is obtained by the current detection unit while the control unit controls the voltage control unit to cause the coil current to flow from the first coil toward the second coil.

11. The motor control apparatus according to claim 10, wherein the update processing includes first processing and second processing, wherein the first processing includes a fourth period and a fifth period that follows the fourth period, wherein the second processing includes a sixth period and a seventh period that follows the sixth period, and wherein the control unit is further configured to:

during the fourth period and the sixth period, control the voltage control unit such that the pulse width modulation signal that changes in accordance with the first maximum value is applied to the second terminal, during the fifth period, obtain a fourth detection result from the current detection unit by controlling the voltage control unit such that the pulse width modulation signal that changes in accordance with a fourth maximum value is applied to the first terminal, during the sixth period, obtain a fifth detection result from the current detection unit by controlling the voltage control unit such that the pulse width modulation signal that changes in accordance with a fifth maximum value that is different from the fourth maximum value is applied to the first terminal, determine, based on the fourth maximum value, the fifth maximum value, the fourth detection result, and the fifth detection result, a maximum value of a duty cycle of the pulse width modulation signal according to which the first detection result is obtained, and update the second maximum value to the determined maximum value.

12. The motor control apparatus according to claim 11, wherein the first detection result, the fourth detection result, and the fifth detection result are each a maximum value of the coil current flowing from the first coil toward the second coil, and the second detection result is a maximum value of the coil current flowing from the second coil toward the first coil.

13. The motor control apparatus according to claim 1, wherein the first detection result is a maximum value of the coil current flowing from the first coil toward the second coil, and the second detection result is a maximum value of the coil current flowing from the second coil toward the first coil.

14. An image forming apparatus comprising:

a rotation member configure to convey a sheet along a conveyance path;

an image forming unit configured to form an image onto the sheet that is conveyed on the conveyance path;

a motor configured to drive the rotation member or the image forming unit; and a motor control unit configured to control the motor, wherein the motor control unit includes:

a voltage control unit configured to control a voltage when applied to a plurality of coils of the motor in order to cause a coil current to flow through the plurality of coils, a current detection unit configured to detect the coil current flowing through the plurality of coils, and a control unit configured to determine a stop position of a rotor of the motor by executing measurement processing on sets of coils each consisting of two coils from among the plurality of coils, wherein, when the measurement processing is performed on a set of the sets of coils, the control unit obtains a first detection result from the current detection unit by controlling the voltage control unit to cause the coil current to flow from a first coil of the set to a second coil of the set, then obtains a second detection result from the current detection unit by controlling the voltage control unit to cause the coil current to flow from the second coil of the set to the first coil of the set, and then determines the stop position of the rotor of the motor based on the first detection result and the second detection result obtained for each set on which the measurement processing is performed.

\* \* \* \* \*